H. M. EDSON.

Vulcanizing Flasks for Rubber.

No. 5,979. Reissued July 21, 1874.

WITNESSES

F. H. Schott.

C. L. Ewert

INVENTOR

H. M. Edson

Alexander Mason

Attorneys

UNITED STATES PATENT OFFICE.

HORACE M. EDSON, OF MOUNT VERNON, OHIO, ASSIGNOR TO JOHN R. B. RANSOM.

IMPROVEMENT IN VULCANIZING-FLASKS FOR RUBBER.

Specification forming part of Letters Patent No. 79,816, dated July 14, 1868; reissue No. 5,979, dated July 21, 1874; application filed June 18, 1874.

*To all whom it may concern:*

Be it known that I, HORACE M. EDSON, of Mount Vernon, in the county of Knox and State of Ohio, have invented certain new and useful Improvements in Machinery for Closing Vulcanizing-Flasks; and I do hereby declare the following to be a full, clear, and exact description thereof, reference being had to the accompanying drawings, and to the letters of reference marked thereon.

The nature of my invention consists in a vulcanizer provided with means for closing the vulcanizing-flasks inside of the vulcanizer at any time desired without removing them therefrom or opening the vulcanizer, whereby the process of vulcanizing may go on without interruption or delay from the beginning to the completion of the process, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
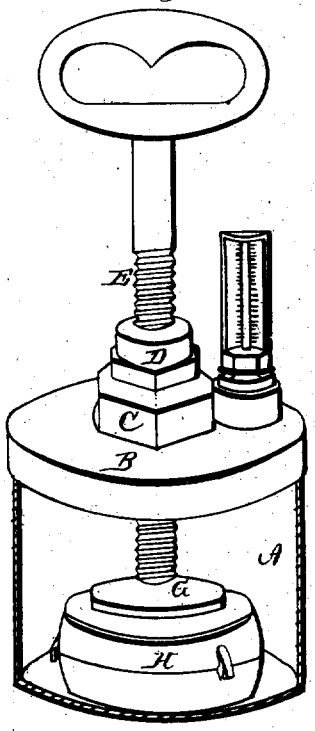

Figure 1 is a perspective view of my vulcanizer, partly in section to show the flask therein. Figs. 2, 3, 4, 5, and 6 are detailed views of certain parts thereof.

Figure 2:
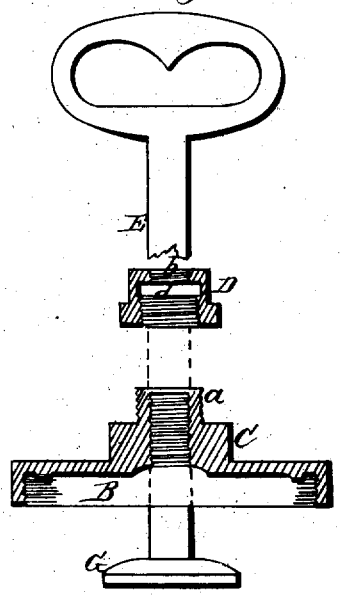
Figure 5:
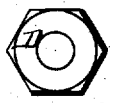
Figure 3:
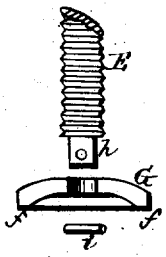
Figure 6:
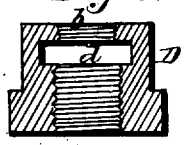
Figure 4:
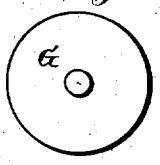

A represents the vulcanizer, constructed of any suitable material, and of any dimensions desired. The top head B of the vulcanizer is screwed upon the upper end thereof, and in the center of said head is formed a nut, C. The upper part of the nut C is turned down of smaller diameter, and provided with exterior screw-threads, as shown at *a* in Fig. 2. Upon this part of the nut is screwed a steam-tight packing-box, D, having a thread, *b*, cut in its upper end, which thread corresponds with the interior thread of the nut C. E represents a screw screwed down through the packing-box D and nut C. This screw is packed steam-tight by means of suitable packing inserted in a cavity, *d*, inside of the box D, as shown in Figs. 2 and 6. The lower end of the screw is turned to form a round tenon, *h*, which is passed through a central aperture in a concave button, G, and said button is held on the tenon against the shoulder *x* by a pin, *i*. The rim *f* of the button G is flat, and rests on top of the vulcanizing-flasks H, inside of the vulcanizer, and will remain stationary while closing the flasks by turning the screw E.

By means of the above-described machinery, the flasks containing the rubber or other vulcanizing substance can be placed in the vulcanizer, in cold water, and when the heat is applied the steam-tight packing-box D prevents the steam from escaping around the screw E, and by turning said screw down upon the flasks the flasks can be closed inside of the vulcanizer at will, at any time, inside of the vulcanizing-point, after the rubber or other vulcanizing material becomes soft enough to admit of the closing of the flasks; and the process of vulcanizing the rubber or other material in the flasks will go on without interruption or delay from the beginning to the completion of the process.

I do not claim, broadly, closing a mold by means of a screw or other mechanical device outside of or irrespective of the boiler; but I do claim—

The combination, in a vulcanizing apparatus, of a closed boiler containing a vulcanizing-mold and a screw-rod or its equivalent, which extends outside of the boiler, for closing the mold therein, substantially as set forth.

In testimony that I claim the foregoing I have hereunto set my hand this 27th day of May, 1874.

HORACE M. EDSON.

Witnesses:

DESAULT R. KIRK,

H. J. RAFFENSPERGER.